(12) United States Patent
Large

(10) Patent No.: US 7,503,713 B2
(45) Date of Patent: Mar. 17, 2009

(54) ACCESSIBLE TECHNOLOGY KEYBOARD

(76) Inventor: William Thomas Large, 444 Oceanfront, Long Beach, NY (US) 11561

( * ) Notice: Subject to any disclaimer, the term of this patent is extended or adjusted under 35 U.S.C. 154(b) by 0 days.

(21) Appl. No.: 11/857,092

(22) Filed: Sep. 18, 2007

(65) Prior Publication Data

US 2008/0075518 A1  Mar. 27, 2008

Related U.S. Application Data

(60) Provisional application No. 60/827,207, filed on Sep. 27, 2006.

(51) Int. Cl.
 *G06F 3/023* (2006.01)
 *B41J 5/10* (2006.01)
(52) U.S. Cl. ........................ 400/489; 400/472
(58) Field of Classification Search ........................ None
See application file for complete search history.

(56) References Cited

U.S. PATENT DOCUMENTS

| | | | | |
|---|---|---|---|---|
| 5,410,333 A | * | 4/1995 | Conway | 345/169 |
| 5,612,691 A | * | 3/1997 | Murmann et al. | 341/22 |
| 6,392,870 B1 | * | 5/2002 | Miller, Jr. | 361/680 |
| 6,575,647 B1 | * | 6/2003 | Daniel | 400/472 |
| 7,088,339 B2 | * | 8/2006 | Gresham | 345/168 |
| 2006/0099023 A1 | * | 5/2006 | Katz et al. | 400/472 |

FOREIGN PATENT DOCUMENTS

| | | | | |
|---|---|---|---|---|
| JP | 62173512 A | * | 7/1987 |
| JP | 04365115 A | * | 12/1992 |
| JP | 09026842 A | * | 1/1997 |
| JP | 09305280 A | * | 11/1997 |
| JP | 2004355229 A | * | 12/2004 |
| JP | 2005079851 A | * | 3/2005 |

OTHER PUBLICATIONS

Machine translation of JP 2005079851 to Ando from Japanese Patent Office website.*

* cited by examiner

*Primary Examiner*—Daniel J Colilla
(74) *Attorney, Agent, or Firm*—Jennifer Meredith, Esq.; Meredith & Keyhani, PLLC

(57) ABSTRACT

A keyboard comprising: at least a first keyboard portion and second keyboard portion, wherein the first keyboard portion is hingedly attached to the second keyboard portion to allow keyboard use in a flat position and an inverted V position.

23 Claims, 5 Drawing Sheets

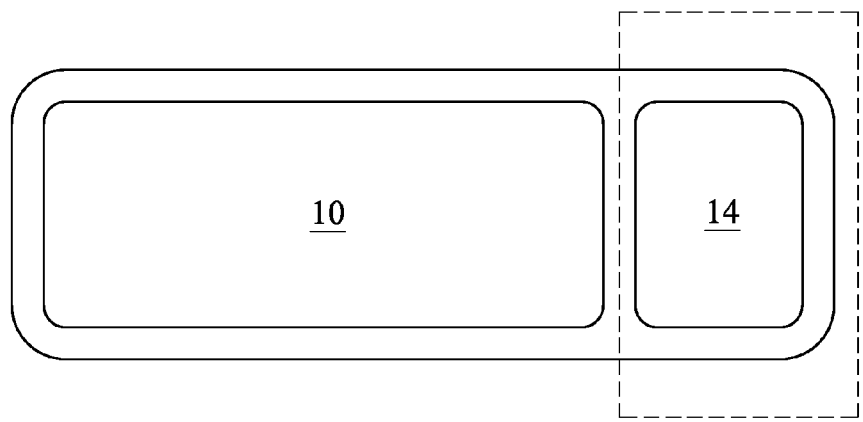
FIG. 1
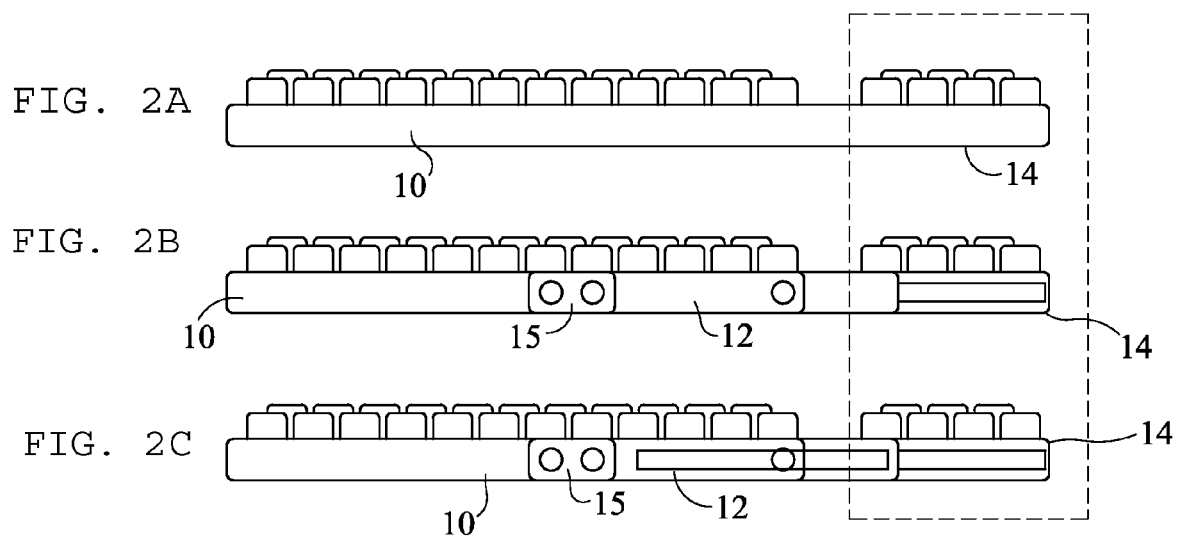

ACCESSIBLE TECHNOLOGY KEYBOARD

This application claims priority to provisional patent application 60/827,207 filed Sep. 27, 2006.

Accessible Technology is defined under Section 508 of the US Rehabilitation Act. The standards require that user controls upon devices procured by the US Federal Government will be usable by one handed, no tight grasping, pinching, or twisting of the wrist (See Section 508 Standards subsection 1193.23 (k)2). This has been achieved in the design of a computer mouse but has yet to be achieved in an effective keyboard design as conventional keyboards invariably require the wrist to be twisted so away from the "Neutral Handshake Position" [OSHA definition of a neutral wrist] in order to be used.

Prior art has taught the ergonomic advantages of working in an upright or vertical position with respect to static posture loads inducing fatigue in muscles. However, prior art, such as U.S. Pat. No. 5,137,384, is restrictive insofar as it calls for a "rigid vertical frame" to be employed. This is also at odds with keyboard typing convention and custom and practice and it offers no alternative, "usual", working position which therefore designates it as assistive technology, designed for those with a dexterity disability, and not Accessible Technology, which is intended to be a Universal Design that easily adapts to accommodate disability.

U.S. Pat. No. 5,137,384, while having novelty value, is "redundant" in the general marketplace much like the Dvorak keyboard layout, the novelty of which has not overcome the inertia of custom and practice. Other examples (for example U.S. Pat. No. 5,336,001) like the former prior art cited, they accommodate disability and do not provide for Accessibility, which is to deliver a practical tool that can be used by all. In addition they also tilt outwards so widening the operating zone of the operator as opposed to the design herein which folds through the form of an inverted "V" and so narrows the operating zone which has ergonomic advantage in regards to reducing abduction of the shoulders while keyboarding or using an input device to either side of the keyboard.

There invention herein delivers a more ergonomic and "Accessible" keyboard that to all intents and purposes looks, acts and feels like a conventional keyboard yet by simple adjustment and rearrangement provides for Accessibility and meets the standards set forth in Section 508, in relation to "Operable Controls".

These and other features, aspects and advantages of the present invention will become better understood with reference to the following drawings, description and claims.

BRIEF DESCRIPTION OF THE DRAWINGS

FIG. 1 depicts the problem sought to be solved;

FIG. 2A depicts the prior art and FIGS. 2B-C depict a keyboard according to the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 3A:
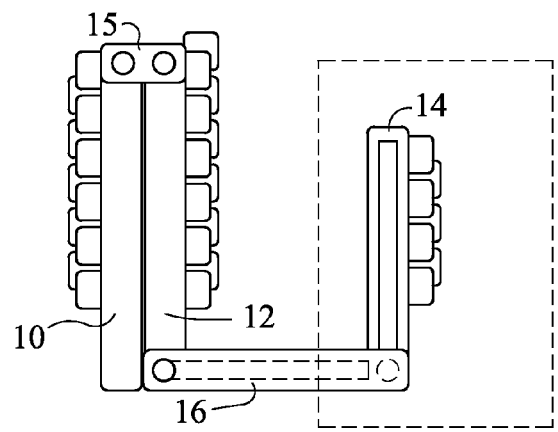
FIG. 3 depicts a keyboard display according to the present invention.
Figure 3B:
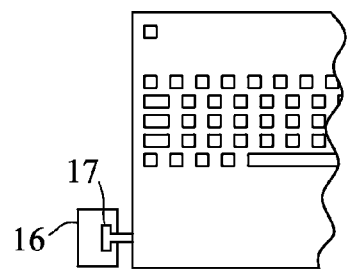
Figure 3C:
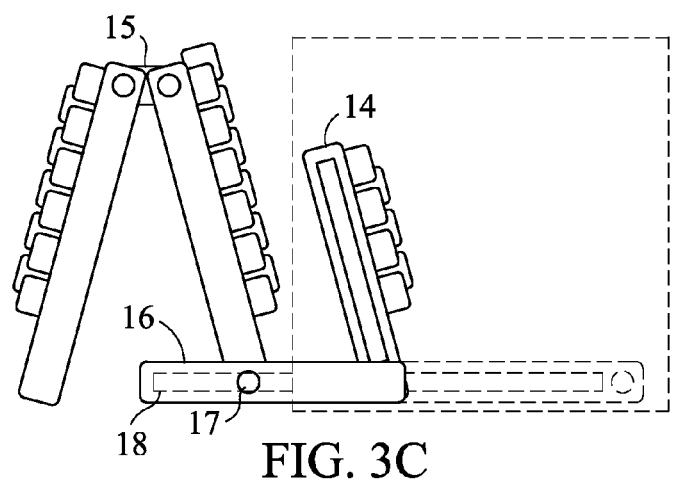
Figure 3D:
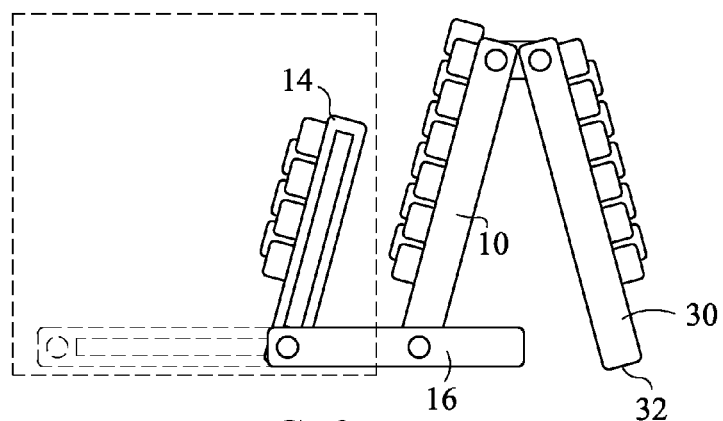
Figure 4:
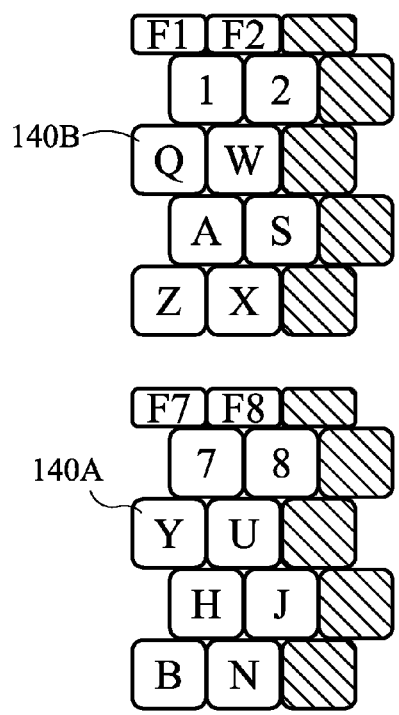
FIG. 4 depicts a keyboard according to the present invention.

The invention herein disclosed describes a means by which a conventional keyboard layout (FIG. 1) can be articulated away from the conventional palm down wrist twisting layout into a vertically aligned wrist untwisted orientation. FIGS. 2A-2C shows the front cross sectional view of a conventional key board as well as the same views for a keyboard to the design depicted herein, both external, and for clarity, internal views to denote articulation points. FIGS. 3-5 depict the front cross sectional view of the keyboard arrangement post articulation into the Section 508 complying and more ergonomic orientation. For completeness, and to demonstrate how this commonly employed keyboard feature is incorporated into this invention, a separate numeric keypad (14) is shown. It is however notated as optional, as numeric keypads (14) do themselves create separate ergonomic challenges and in one iteration of this invention a keyboard so designed would be built without one.

Figure 5A:
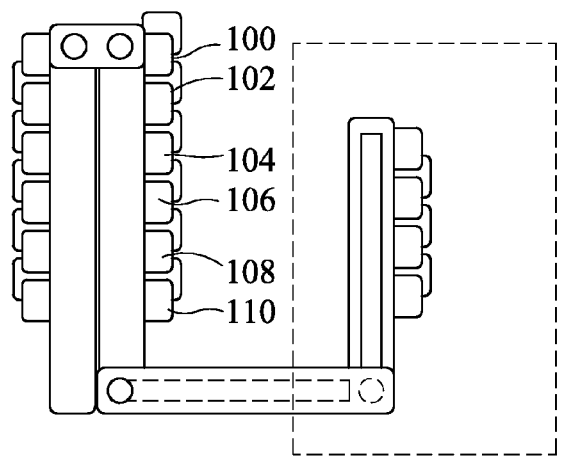
FIG. 5 depicts a keyboard according to the present invention.
Figure 5B:
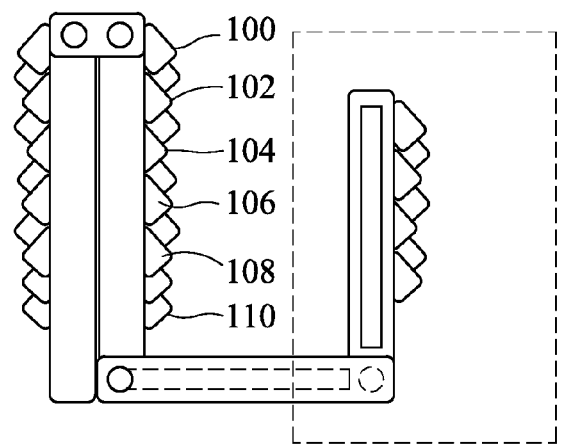
Figure 5C:
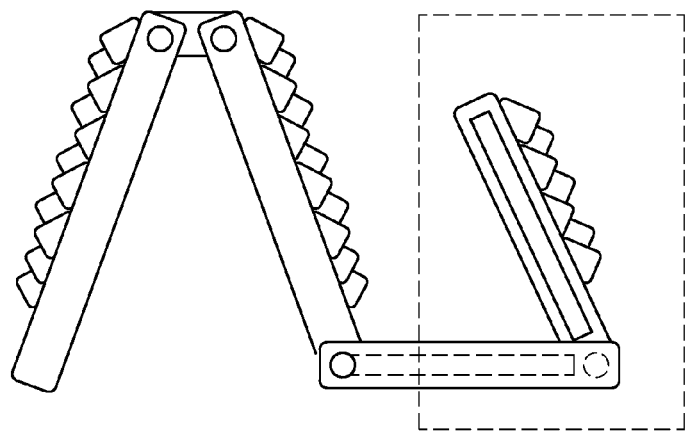
Figure 5D:
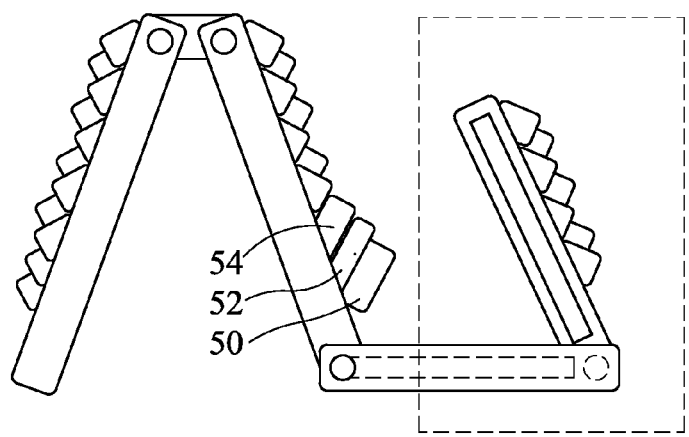

As shown in FIG. 3, a keyboard is provided comprising: at least a first keyboard portion (10), second keyboard portion (12) and optionally a third keyboard portion (14) and fourth support portion (16), wherein the first keyboard portion (10) is hingedly attached to the second keyboard portion (12) to allow keyboard use in a flat position and an inverted V position. To attach the first keyboard portion (10) to the second keyboard portion (12) there may be a hinge bar (15). The first keyboard portion (10) may also be directly attached to the second keyboard portion (12) without departing from the scope of the present invention. The fourth support portion (16) is hingedly attached at least one of the first keyboard portion (10) (as shown in FIG. 3*c* to provide a left handed user portion) and the second keyboard portion (12) (as shown in FIG. 3*b* to provide a right handed user portion) to provide a third keyboard portion. Each keyboard portion may lock into position and may also slide along the next portion. As shown in FIG. 3*b* (front view and side view), there may be a hinge attachment means (17) which fits into a keyboard portion to allow the circular hinge attachment means (17) to slide along a portion (e.g. 16). The third keyboard portion (14) may lock in a position parallel to at least one of the first keyboard portion (10) and the second keyboard portion (12). The first keyboard portion (10), the second keyboard portion (12) and the third keyboard portion (14) may be further comprised of a plurality of keys arranged in an array and wherein the third keyboard portion (14) has fewer rows than the first keyboard portion (10) and the second keyboard portion (12) to provide a parallel and slightly lower staggered keyboard. This is depicted in FIGS. 3*a*, 3*b* and 3*c*. For example, the third keyboard portion (14) has four rows and the second keyboard portion (12) has six rows. This allows for easier use as the hand can easily maneuver between the second keyboard portion (12) and third keyboard portion (14). There may be a fifth support portion (18) wherein the fifth support portion (16) is in hinged communication and supports at least one of the first keyboard portion (10) and the second keyboard portion (12). Any of the keyboard portions may have a plurality of keys; a switching means (32); and a height adjustment means (30) and may be in communication with the switching means (32) and the plurality of keys, wherein the height adjustment means (30) raises and lowers the plurality of keys according to the switching means (32). The switching means (32) as shown is a lever, but it may also be voice activated switching means, toggle, key, lever, bar, switch, remote switch (such as a peddle) and optical means. When switched the keys when pressed individually in first mode have a first output and when the keys when pressed individually in second mode have a second output. The keys may or may not be at a first height in the first mode and be at a second height in a second mode, where the second height is different than the first height. This may be particularly desirable for one handed use as there may not be a sufficient number of keys. At least one of the first keyboard portion and the second keyboard portion may have: at least one key; a switching means; a key adjustment means (30) in communication with the switching means and at least one key, wherein the key adjustment means adjusts the angle of the at least one key according to the switching means. Both the key adjustment means and height adjustment means may be any support, screw, etc. under the keys and in communication with the underside of the keys which cause the key to be at an angle or desired height. The term key adjustment means is intended to refer to a means for adjusting the angle of the keys. For example, as shown in FIGS. 5A, 5B and 5C, it may be desirable to tilt the angle of the keys. As shown in FIG. 5D it may be desirable to also adjust the height of the keys. As shown in FIG. 5D, keys 50, 52 and 54 are higher than the other keys. It should also be understood that individual keys may be adjusted for angle and height. Also, it may be desirable to adjust a section of keys or all keys. Also, the keys may be at a first height for a first output and a second height for a second output. For example, the key may be a Q at a lower height, the key may be raised and then correlate to a Y. FIG. 5B for example depicts an embodiment where all keys are adjusted to approximately a 45 degree angle. The switching means accepts a directive which in turn directs the key adjustment means and/or height adjustment means. The switching means may be a voice activated switching means in which the directive is voice activated, toggle, key, lever, bar, switch, remote switch and an optical means in which the directive is mechanical.

One handed operation is a requirement under Section 508 and to accomplish this different options may be employed. In a one handed use scenario the law is obviously anticipating that two hands are not available and it should therefore be assumed that in one scenario the left hand is unavailable for typing and in another, the right hand is unavailable. The invention herein described, unlike prior art, accommodates either scenario while still maintaining compliance with the other elements of Section 508, more especially the wrist twisting element. In either scenario there is an actuator that allows for a second, so dual, functionality of the keys by the reassignment of them. Reassignments are subject to that side of the vertical half keyboard, depicted in diagram 4, that is to be used.

In a right hand side used scenario: In the default or "low" actuated mode the keys hit would transcribe those letters corresponding to the standard QWERTY keyboard, or their usually assigned characters. That is to say if the letter "Y" (140A) were hit, which is on the right hand side of the now upright half keyboard, the letter "Y" would be seen upon the output device. In the high actuated position the letter "Y" would now transcribe for the letter "Q" (140B), which is the letter that is diametrically opposite to the "Y" and is the "QWERTY assigned key" that is located at the base of the left hand element of the (unused in this right hand only scenario) vertical half keyboard. See diagram 4. In a left hand used scenario: the logic and assignment would be the opposite of, or mirror, that described in the right hand used scenario above. That is to say that "Q", in a high actuated mode, would transcribe a "Y" and so on and so forth. Examples of methods of actuation from the low to high condition and vice versa: (1) An additional key on the keyboard that latches or toggles, so remains on or off so holding the selected high or low condition; (2) A key or lever, bar or other physical switch on the keyboard that is actuated and while actuated maintains the "high" condition but does not latch or toggle; (3) A time based determination such that dwelling (depressing for longer) upon each key beyond a preset, and user variable, time actuates the alternative, or high, condition; (4) A voice command; (5) A separate and remote physical switch, one example of which is a foot pedal; (6) The provision for a means of communicating with the same; (7) An optical sensor.

It should be understood that the foregoing relates to preferred embodiments of the invention and that modifications may be made without departing from the spirit and scope of the invention as set forth in the following claims.

I claim:

1. A keyboard comprising:
   at least a first keyboard portion, second keyboard portion, third keyboard portion and an elongated first support portion, wherein said first keyboard portion is hingedly attached to said second keyboard portion to allow keyboard use in a flat position and an inverted V position; wherein said third keyboard portion is hingedly attached to said first support portion, and wherein said elongated first keyless support portion is hingedly attached to at least one of said first keyboard portion and said second keyboard portion to provide said third keyboard portion such that it can be used in a position that is parallel to one half of said inverted V.

2. A keyboard as in claim 1, wherein said third keyboard portion locks in a position parallel to at least one of said first keyboard portion and said second keyboard portion.

3. A keyboard as in claim 2, wherein each said first keyboard portion, said second keyboard portion and said third keyboard portion are further comprised of a plurality of keys arranged in an array and wherein said third keyboard portion has fewer rows than said first keyboard portion and said second keyboard portion to provide a parallel and slightly lower staggered keyboard.

4. A keyboard as in claim 1, further comprising a second support portion wherein said second support portion is in hinged communication and supports at least one of said first keyboard portion and said second keyboard portion.

5. A keyboard as in claim 1, at least one of said first keyboard portion and said second keyboard comprising:
   a plurality of keys;
   a switching means;
   a height adjustment means in communication with said switching means and said plurality of keys, wherein said height adjustment means raises and lowers at least one of said plurality of keys according to said switching means.

6. A keyboard as in claim 5, wherein said keys when pressed individually in first mode have a first output and are at a first height and wherein said keys when pressed individually in second mode have a second output and are at a second height that is different than said first height.

7. A keyboard as in claim 1, at least one of said first keyboard portion and said second keyboard portion comprising:
   at least one key;
   a switching means;
   a key adjustment means in communication with said switching means and at least one key, wherein said key adjustment means adjusts the angle of said at least one key according to said switching means.

8. A keyboard as in claim 1, wherein at least one of said first keyboard portion and said second keyboard portion are comprised of a plurality of keys and wherein at least one of said keys when pressed individually in first mode has a first output and when pressed individually in second mode has a second output.

9. A keyboard as in claim 1, wherein said third keyboard portion is further comprised of a plurality of keys and wherein at least one of said keys when pressed individually in first mode has a first output and when pressed individually in second mode has a second output.

10. A keyboard as in claim 8, further comprising a switching means for switching between said first mode and said second mode.

11. A keyboard as in claim 10, wherein said switching means is selected from the group consisting of voice activated switching means, toggle, key, lever, bar, switch, remote switch and optical means.

12. A keyboard as in claim 9, further comprising a switching means for switching between said first mode and said second mode.

13. A keyboard as in claim 12, wherein said switching means is selected from the group consisting of voice activated switching means, toggle, key, lever, bar, switch, remote switch and optical means.

14. A keyboard comprising:
   at least a first keyboard portion, second keyboard portion, third keyboard portion and an elongated first support keyless portion,
   wherein said first keyboard portion is hingedly attached to said second keyboard portion to allow keyboard use in a flat position and an inverted V position
   wherein said elongated first support keyless portion is hingedly attached to said third keyboard portion and at least one of said first keyboard portion and said second keyboard portion.

15. A keyboard as in claim 14, wherein said third keyboard portion locks in a position parallel to at least one of said first keyboard portion and said second keyboard portion.

16. A keyboard as in claim 14, wherein each said first keyboard portion, said second keyboard portion and said third keyboard portion are further comprised of a plurality of keys arranged in an array and wherein said third keyboard portion has fewer rows than said first keyboard portion and said second keyboard portion to provide a parallel and slightly lower staggered keyboard.

17. A keyboard as in claim 14, further comprising a second support portion wherein said second support portion is in hinged communication and supports at least one of said first keyboard portion and said second keyboard portion.

18. A keyboard as in claim 14, at least one of said first keyboard portion and said second keyboard comprising:
   a plurality of keys;
   a switching means;
   a height adjustment means in communication with said switching means and said plurality of keys, wherein said height adjustment means raises and lowers said plurality of keys according to said switching means.

19. A keyboard as in claim 14, wherein said keys when pressed individually in first mode have a first output and are at a first height and wherein said keys when pressed individually in second mode have a second output and are at a second height that is different than said first height.

20. A keyboard as in claim 14, at least one of said first keyboard portion and said second keyboard portion comprising:
   at least one key;
   a switching means;
   a key adjustment means in communication with said switching means and at least one key, wherein said key adjustment means adjusts the angle of said at least one key according to said switching means.

21. A keyboard as in claim 14, wherein at least one of said first keyboard portion, said second keyboard portion and said third portion are comprised of a plurality of keys and wherein at least one of said keys when pressed individually in first mode has a first output and when pressed individually in second mode has have a second output.

22. A keyboard as in claim 21, further comprising a switching means for switching between said first mode and said second mode.

23. A keyboard as in claim 22, wherein said switching means is selected from the group consisting of voice activated switching means, toggle, key, lever, bar, switch, remote switch and optical means.

* * * * *